APPARATUS FOR REPRODUCING VIDEO SIGNALS IN A REVERSED LINE SCAN
Filed Aug. 22, 1966
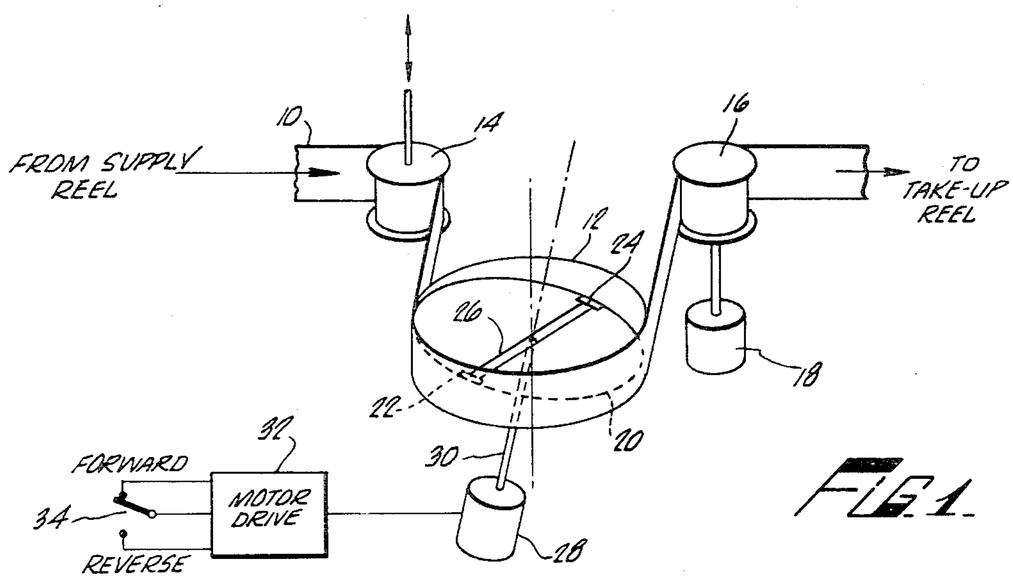
FIG. 1
FIG. 2
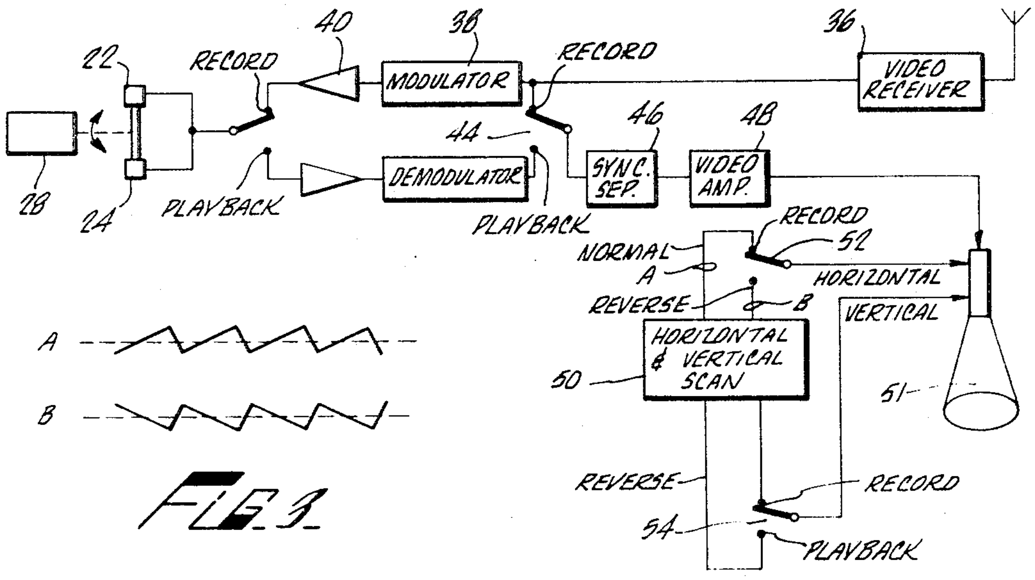
FIG. 3
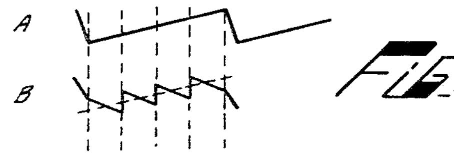
FIG. 4
INVENTOR.
NORTON W. BELL
BY
Christie, Parker & Hale
ATTORNEYS.

United States Patent Office 3,469,029
Patented Sept. 23, 1969

3,469,029
APPARATUS FOR REPRODUCING VIDEO SIGNALS IN A REVERSED LINE SCAN

Norton W. Bell, Pasadena, Calif., assignor to Bell & Howell Company, Chicago, Ill., a corporation of Illinois
Filed Aug. 22, 1966, Ser. No. 573,906
Int. Cl. H04n 5/76, 5/78
U.S. Cl. 178—6.6 6 Claims

ABSTRACT OF THE DISCLOSURE

There is described a magnetic recording and playback system using rotating magnetic heads in which the heads scan across the tape at high speeds and in which the direction of scanning is reversed during playback without reversing the direction of magnetic tape drive.

This invention relates to magnetic recording of video signals and, more particularly, is concerned with a recording and playback system in which the video signal is reproduced on a reversed time basis in relation to the original video signal as recorded.

In recording of video signals on magnetic tape, a broad band of frequencies must be accommodated. If during the recording and reproducing process, a signal is passed through a network in which the time delay for different frequency components of this signal is not the same at all frequencies, waveform distortion results in the reproduced signal. This type of distortion is commonly referred to as delay distortion. To the extent that common and/or similar networks are used during the recording and the playback, delay distortion is compounded in the case of magnetic recording as the result of the double delay. However, because any delay distortion occurring during the recording process results in an actual physical displacement of the signal components on tape, it is possible to balance out such delay distortion effects by running the magnetic tape in the reverse direction during playback. While such an arrangement overcomes the problem of delay distortion, it introduces a time reversal in the reproduced signal. Such time reversal normally is not possible because the time reversal destroys the sense of the information, such as in an audio recording, where to play the record backwards would obviously be unacceptable.

However, in video recording because of the memory effect of the phosphors in reproducing the video signals into picture form it is possible to utilize time reversal of the video information signal as long as the frame sequence of pictures is not also reversed.

In brief, the present invention is directed to a rotating head type of video tape recorder in which one or more magnetic heads are caused to scan at an angle across the tape at relatively high speed while the tape advances along its length at a relatively slow speed. By reversing the direction of rotation of the magnetic heads during playback, the signal can be reproduced in a time reversed sequence to permit cancellation of phase distortion. At the same time, by advancing the tape in the same direction during recording and playback, the frame sequence during playback is the same as during recording. Depending on the length of each track on the tape produced by the rotating heads, individual lines, groups of lines, or the whole frame of the video raster may be played back in the reverse time sequence. If, for example, one pass of the magnetic head records an individual line of the video raster, on playback the vertical scan direction could be operated in normal fashion, but the horizontal scan must be reversed. If all the lines of a frame are reproduced by one scan of the magnetic head, then both the vertical scan and the horizontal scan directions must be reversed during playback.

For a more complete understanding of the invention, reference should be made to the accompanying drawings, wherein:

FIGURE 1 is a diagrammatic showing of a slant track tape transport;

FIGURE 2 is a schematic block diagram of the circuit of the video recorder incorporating the features of the present invention; and FIGURES 3 and 4 show a series of waveforms of the scan signals.

Referring to FIGURE 1 in detail, there is shown a portion of a conventional slant track type of video tape recorder in which the magnetic tape 10 is transported from a supply reel to a take-up reel (not shown) through an operational zone which includes a large hollow drum member 12. The magnetic tape 10 is guided through a 180° wrap angle around the member 12 by guide rollers indicated at 14 and 16. The guide roller 16 may, for example, be in the form of a capstan driven by a constant speed motor 18 for moving the tape at a uniform linear velocity around the periphery of the drum 12.

The drum 12 is provided with a peripheral slot 20 which lies in a plane extending at an angle ($90°-a$) to the axis of revolution of the drum 12. The angle of the plane of the slot is such that the slot is near the upper edge of the margin of the tape where the tape moves on to the surface of the drum 12 and is adjacent to the lower margin of the tape where the tape leaves the surface of the drum. The surface of the tape is scanned through the slot 20 by a pair of magnetic heads 22 and 24 supported at diammetrically opposite ends of a supporting arm 26 within the drum 12. The arm 26 is rotated about its center by a motor 28 having a shaft 30 joined to the arm 26. Thus rotation of the motor 28 causes the heads 22 and 24 to alternately scan the surface of the magnetic tape along slantwise tracks through the slot 20. The tape transport as thus far described is a conventional type of tape transport for video recorders.

The motor 28 is driven from a suitable motor drive 32 which by means of a switch 34 causes the motor 28 to be driven in either a forward or reverse direction at a constant speed. Typically, the motor 28 might be a synchronous motor operated at constant speed by a constant frequency alternating current source. The motor 28 might include a split phase starting winding with the phase being reversed in response to the switch 34 to select the direction in which the motor is started.

Referring to FIGURE 2, the video recorder is shown as including a video receiver 36 for receiving a television signal over the air. However, the source of the video signal may be a camera or other well known source of video signals. The output of the video receiver 36 is a composite video signal including horizontal and vertical synchronizing pulses together with the amplitude modulated video information.

The video signal is preferably frequency modulated by a modulator 38, amplified by a suitable amplifier 40 and connected through a switch 42 to the magnetic heads 22 and 24. The switch 42 is positioned in the record position.

At the same time, the video signal from the output of the receiver 36 may be applied through a switch 44 in the record position to a standard sync separating circuit which separates the sync pulses from the video information signals. The video information signal is amplified by a video amplifier 48 and applied to modulate the beam of a cathode ray picture tube 51 in conventional manner. The horizontal and vertical sync pulses are applied to suitable horizontal and vertical scan generators, indicated generally at 50. Standard sawtooth type horizontal and vertical scan signals are coupled respectively by a switch 52 and a switch 54 when in the record position. The waveform of the standard horizontal scan signal is shown at A in FIGURE 3. This produces the normal left to right horizontal line scan and the top to bottom vertical scan of the cathode ray beam of the tube 51 in reproducing the picture from the composite video signal.

During playback of the video tape, according to the teaching of the present invention, the motor drive circuit 32, by means of the switch 34 is operated in the reverse drive mode so that the magnetic heads 22 and 24 scan the slant tracks on the magnetic tape in the reverse direction from that of recording. Typically, the speed of rotation of the motor 28 is selected so that one complete frame of information is laid down in a single slant track by the scan of one of the magnetic heads 22 or 24. This means that during playback, all of the information in a single track is reproduced in reverse time sequence from that in which the video signal is recorded. This time reversal of the sequence of video information in a single track requires reversal of both the horizontal and vertical scan of the tube 51. To this end, the switches 52 and 54, when switched to the playback position, provide sawtooth signals of reverse polarity to the horizontal and vertical deflection of the tube 51. The waveform of the normal horizontal sweep voltage and the reverse horizontal sweep voltage are shown in line A and B respectively of FIGURE 3 and correspond to the voltages as appearing at A and B at the output of the horizontal scan circuit 50 of FIGURE 2.

It will be appreciated that if the tape 10 were stationary, the magnetic heads 22 and 24 would traverse the same track whether rotated in a forward or reverse direction by the motor 28. However, because the tape is moving from the supply reel to the take-up reel in the same direction both on record and playback, the forward motion of the tape subtracts from the angle of the track when the heads are rotated in one direction and adds to the angle of the track when rotated in the other direction. To ensure that the heads are properly aligned with the tracks on the magnetic tape during both record and playback, a guide roller 18 is provided with flanges and is adjustable along its axis so as to adjust slightly the path of the tape as it passes around the drum 12. By changing this adjustment slightly between record and playback, the heads can be caused to follow the same relative angle on both record and playback. Control of proper tracking between the heads and successive tracks on the tape during playback can be by suitable servo means operating the motor 18 in a manner conventional to slant track tape recorders.

In the arrangement described above in connection with FIGURES 1 and 2, the slant track is made sufficiently long to accommodate one complete frame of video information. Since the tape moves in the same direction during recording and playback, successive frames are formed on the tube 51 during playback in the same time sequence as recorded. However, since the composite video signal from each track is reproduced in reverse time sequence, any phase distortion produced by the record and playback circuitry is effectively cancelled out. This is because any time delay of a particular frequency component in recording on the tape becomes a frequency advance of that component on the tape during playback.

The invention as described obviously is not limited to a slant track type of video recorder. Video recorders are well known in which the magnetic heads are rotated in a direction substantially transverse to the direction of movement of the magnetic tape. Where relatively narrow tape is employed, a single pass of the magnetic head may be limited to recording a single line of video information with successive tracks then producing successive lines on the picture raster. In such event, only the information in a single line is reversed in time, but successive lines making up a complete frame occur in the normal sequence during playback. In such an arrangement, only the horizontal scan is reversed during playback while the vertical scan takes place in normal fashion, i.e., from top to bottom of the screen.

In magnetic tape recorders wherein each pass of the scanning magnetic head across the tape records the video information making up a group of lines less than a complete frame, the vertical scan must be reversed during the reproduction of each group of lines, but successive groups of lines must be positioned vertically in the same order as they normally occur. The vertical scanning signal for a tape recorder in which one-fourth of the lines of a complete frame are recorded during each pass of the magnetic head in scanning across the magnetic tape is shown in FIGURE 4, line A shows the waveform of the normal vertical scan signal during record, while line B shows the waveform necessary to provide the proper vertical scanning during playback. It will be noted that the slope of the signal is reversed during each quarter interval of the vertical sweep but that the average slope is the same as in the normal scan. With this type of waveform, as each group of lines is read out in reverse time sequence by the reverse sweep of the magnetic head, both the horizontal and vertical scan are reversed from normal. However, each successive group is positioned vertically from top to bottom in the normal sequence of vertical scan.

What is claimed is:

1. In a video recorder in which a composite video signal including a pattern of vertical and horizontal sync signals is recorded on magnetic tape by driving the tape past a rotating head that scans across the tape at an angle to the path of the tape, the method of reproducing the signal from the tape comprising the steps of moving the tape in the same direction past the scanning position of the rotating head as during the recording operation, moving the head in the opposite direction along each recorded track on the tape to the direction during the recording operation, reproducing the video information by scanning a light-producing beam in a series of horizontal lines in synchronism with the horizontal sync signal reproduced by the head from the magnetic tape reversing the direction of scan of each horizontal line from the normal direction during the generation of the video signal, and changing the intensity of the light producing beam in synchronism with the video information reproduced by the head from the magnetic tape.

2. The method of claim 1 further including the steps of recording a complete frame of information with each scan of the head across the tape, and inverting the vertical sequence in which the series of horizontal lines are formed in relation to said normal direction.

3. The method of recording, playing back and producing a video picture from a composite video signal generated by scanning an image in a series of parallel horizontal lines in a vertical sequence, the horizontal lines and vertical sequence each being scanned in a predetermined direction, the composite signal having pulses identifying the start of each horizontal line scan and the start of each vertical sequence scan, the method comprising the steps of recording the composite video signal in a series of separate tracks on tape, each track including at least the portion of the video signal for one complete line scan, reproducing the recorded signal by scanning each track in the reverse direction in which it was recorded by scanning successive tracks in the same sequence in which they were recorded, and generating a visual image in response to the reproduced signal by scanning a light-producing beam in a series of parallel horizontal lines in the reverse direction from the direction during generation of the composite signal.

4. The method of claim 3 wherein the composite signal is recorded with all of the lines in a complete vertical sequence being recorded in each track, and where the visual image is reproduced by inverting the vertical sequence of horizontal lines in relation to said predetermined direction during generation of the composite signal.

5. Apparatus for reproducing a video picture from a recorded composite video signal of a standard type having a pattern of vertical and horizontal sync pulses defining the start of the vertical and horizontal scan of an image, wherein the composite signal has been recorded by driving the tape at a relatively slow rate past one or more rotating magnetic heads that scan across the tape at relatively high speed at an angle to the path of the tape, said picture reproducing apparatus comprising means for moving the tape in the same direction and speed as during recording of the signal on tape, means including a magnetic head for scanning across the tape along each of the signal tracks in the reverse direction in which the tape is scanned during recording, means coupled to the output signal for separating out the horizontal and vertical sync signals from the video information signal, picture display means including means for producing a light-producing beam and means for producing a raster scan of the beam in response to the horizontal and vertical sync pulses, said raster producing means including horizontal scan means for generating a horizontal sweep of the light producing beam proceeding in the reverse direction from the horizontal scan of the image in generating the composite signal.

6. Apparatus as defined in claim 5 further including vertical scan means for generating a vertical sweep of the light-producing beam proceeding in the reverse direction from the vertical scan of the image during generation of the composite signal.

References Cited

UNITED STATES PATENTS

| | | | |
|---|---|---|---|
| 2,287,307 | 6/1942 | Herbst. | |
| 2,588,915 | 3/1952 | Erikson | 179—100.1 |
| 3,294,902 | 12/1966 | Maxey. | |

ROBERT L. GRIFFIN, Primary Examiner

D. E. STOUT, Assistant Examiner